US010439213B2

(12) United States Patent
Zhang et al.

(10) Patent No.: US 10,439,213 B2
(45) Date of Patent: Oct. 8, 2019

(54) NITROGEN-DOPED GRAPHENE COATED NANO SULFUR POSITIVE ELECTRODE COMPOSITE MATERIAL, PREPARATION METHOD, AND APPLICATION THEREOF

(71) Applicant: SUZHOU INSTITUTE OF NANO-TECH AND NANO-BIONICS, CHINESE ACADEMY OF SCIENCE, Suzhou (CN)

(72) Inventors: Yuegang Zhang, Suzhou (CN); Yongcai Qiu, Suzhou (CN); Wanfei Li, Suzhou (CN); Guizhu Li; Yuan Hou, Suzhou (CN); Meinan Liu, Suzhou (CN); Lisha Zhou, Suzhou (CN); Fangmin Ye, Suzhou (CN); Hongfei Li, Suzhou (CN)

(73) Assignee: SUZHOU INSTITUTE OF NANO-TECH AND NANO-BIONICS, CHINESE ACADEMY OF SCIENCE, Suzhou (CN)

( * ) Notice: Subject to any disclaimer, the term of this patent is extended or adjusted under 35 U.S.C. 154(b) by 13 days.

(21) Appl. No.: 15/317,405

(22) PCT Filed: Jun. 5, 2015

(86) PCT No.: PCT/CN2015/080885
§ 371 (c)(1),
(2) Date: Dec. 8, 2016

(87) PCT Pub. No.: WO2015/188726
PCT Pub. Date: Dec. 17, 2015

(65) Prior Publication Data
US 2017/0125800 A1 May 4, 2017

(30) Foreign Application Priority Data

Jun. 11, 2014 (CN) .......................... 2014 1 0256653

(51) Int. Cl.
*H01M 4/00* (2006.01)
*H01M 4/36* (2006.01)
(Continued)

(52) U.S. Cl.
CPC ............. *H01M 4/366* (2013.01); *B01J 13/08* (2013.01); *H01M 4/38* (2013.01); *H01M 4/587* (2013.01);
(Continued)

(58) Field of Classification Search
CPC ............... H01M 4/587; H01M 4/5815; H01M 2004/028; H01M 4/366; B01J 13/08
See application file for complete search history.

(56) References Cited

U.S. PATENT DOCUMENTS 9,780,379 B2 * 10/2017 Zhamu ................. H01M 4/628
2013/0189580 A1 * 7/2013 Dai .......................... H05K 3/30
429/221

(Continued)

*Primary Examiner* — Cynthia H Kelly
*Assistant Examiner* — Monique M Wills
(74) *Attorney, Agent, or Firm* — Goldilocks Zone IP Law

(57) ABSTRACT

The invention provides a nitrogen-doped graphene coated nano sulfur positive electrode composite material, a preparation method, and an application thereof. The composite material includes: an effective three-dimensional conductive network formed by overlapping of nitrogen-doped graphenes, and nano sulfur particles coated by nitrogen doped graphene layers evenly. The preparation method includes: dispersing nitrogen-doped graphenes in a liquid-phase reaction system including at least sulfur source and acid, and depositing nano sulfur particles by an in-situ chemical reaction of the sulfur source and the acid, thereby preparing the positive electrode composite material. The positive electrode composite material of the invention has a high conductivity, a high sulfur utilization rate, and a high rate, thereby restraining the dissolution and shuttle effect in the (Continued)

lithium sulfur batteries, and enhancing the cyclic performance of the batteries.

16 Claims, 6 Drawing Sheets

(51) Int. Cl.
    *B01J 13/08*     (2006.01)
    *H01M 4/58*     (2010.01)
    *H01M 4/587*     (2010.01)
    *H01M 4/38*     (2006.01)
    *H01M 4/62*     (2006.01)
    *H01M 4/02*     (2006.01)

(52) U.S. Cl.
    CPC ......... *H01M 4/5815* (2013.01); *H01M 4/625* (2013.01); *H01M 2004/028* (2013.01)

(56) References Cited

U.S. PATENT DOCUMENTS

2015/0044556 A1*   2/2015   Wang ................... H01M 4/366
                                                          429/213
2015/0191357 A1*   7/2015   Yang .................... H01M 4/583
                                                          428/34.1

* cited by examiner

NITROGEN-DOPED GRAPHENE COATED NANO SULFUR POSITIVE ELECTRODE COMPOSITE MATERIAL, PREPARATION METHOD, AND APPLICATION THEREOF

CROSS REFERENCE TO RELATED PATENT APPLICATIONS

This application claims the benefit under 35 U.S.C. Section 371, of PCT International Application No. PCT/CN2015/080885, filed Jun. 5, 2015, which claimed priority to Chinese Patent Application No. 201410256653.6, filed Jun. 11, 2014, the disclosures of which are hereby incorporated by the references.

BACKGROUND OF THE INVENTION

1. Field of the Invention

The present invention relates to a nitrogen-doped graphene coated nano sulfur positive electrode composite material, a preparation method thereof, and an application of the composite material in lithium sulfur batteries, which relates to chemical power and material science fields.

2. Description of Related Art

The Lithium sulfur batteries, based on oxidation reduction reaction of double electron electrochemical, have been paid more and more attention by academia, industry and governments greatly, because of the advantages of their high theoretical specific capacity (1675 mAh/g, almost 10 times more than the theoretical specific capacity of the traditional $LiFePO_4$ lithium battery), their high theoretical specific energy (2600 Wh/Kg), and the low price and low toxicity due to rich reserves of active substance sulfur.

The lithium sulfur battery device, being a chemical conversion battery, is composed of a sulfur positive electrode, an electrolyte, and a lithium negative electrode. Wherein an active material, a conductive agent and a binder with an appropriate mixing ratio are selected as the sulfur positive electrode. The factors, such as low conductivity and insulation of the sulfur in the active material and the polysulfide ($Li_2S_x$, x=1~8) from the charging and discharging products, the polysulfide ($Li_2S_x$, x=4~8) from the charge-discharge intermediate products easily dissolved in the electrolyte and then shuttling between the two electrodes, and the electrode structure damage as a result of the volume expansion (about 80%) caused when the lithium sulfide is completely converted from the electrochemical reaction of the active material sulfur, all cause the low utilization rate, the irreversible loss and the capacity loss of the active material, thereby causing the low actual capacity, and the poor cyclic performances and rate of the lithium sulfide battery, which seriously restrict the practical application of the battery.

In order to solve the problems in the lithium sulfur battery and to improve the device performance, the most effective method in the present research is to vulcanize the nano-active material and to load the material to the carbon based material (carbon nanotubes, porous carbon, graphene, carbon fiber, graphene oxide, etc) with good conductivity, thereby forming the composite positive electrode material. The utilization rate is improved by using the electrical conductivity of the carbon based material and the electrochemical activity of the low conductivity active substance sulfur realized by touching the nano sulfur. The discharge capacity and cyclic performances are increased by using the high specific surface area of these materials during the electrochemical process and the created negative effects occurred in the electrochemical process. The high specific surface area of these materials limits the polysulfide to be dissolved in the electrolyte during the electrochemical process. For example, the graphene is a single atomic layer carbon film composed of sp2 hybridized carbon atoms arranged in the hexagonal close packed structure. The graphene, having an excellent electrical conductivity, a good chemical stability, excellent mechanical properties and a high theoretical specific surface area (2630 $m^2g^{-1}$), is extremelysuitably used as the conductive carrier of the active material in the battery. At present, the graphene coated sulfur composites in the research (RSCAdvances, 2013, 3, 2558-2560; Nano Lett., 2011, 11, 2644-2647) shows better performance of the battery device. However, the capacity of these composite material under low rate is only 600~800 $mAh \cdot g^{-1}$, the graphene materials under high rate does not show the advantages, which may be related to the reduction of surface area caused by the easy aggregation and stack of unfunctionalized graphene. The graphene oxide supported nano sulfur used as the positive electrode material of the lithium sulfur battery in the research (J.Am. Chem. Soc. 2011, 133, 18522-18525; Nano. Lett., 2013, 13, 5891-5899), shows a good cyclic stability. However, the reduction effect is not good when the graphene oxide is heated under the condition of a low temperature, the conductivity of the obtained composites is worse compared with the graphene, which needs 20 wt % of the conductive agent to be added additionally, thereby increasing the weight of the electrode and greatly reducing the energy density of the battery. The graphene coated sulfur/carbon nano fiber composites in the search (Nano Lett., 2013, 13, 2485-2489), includes the sulfur. The content of the sulfur is only 33%. In such a condition of the low sulfur content, the first discharging capacity of 0.1 C of the composites is only 1047 $mAh \cdot g^{-1}$ and has fallen to 700 $mAh \cdot g^{-1}$ after 50 cycles. The high rate discharge capacity is not prominent, and the capacity of 0.5 C is about 450 $mAhg^{-1}$, the capacity of 1 C is about 400 $mAh \cdot g^{-1}$, and the capacity of 2 C is about 360 $mAh \cdot g^{-1}$. In addition, the graphene dispersion liquid used for coating in the method is made by the reduction of the toxic substance hydrazine as the reducing agent. In the research of multi walled carbon nanotubes coated by graphene/sulfur composite material (Nano Lett., 2013, 13, 4642-4649), the graphene in the composite material is made by heating and reducing the graphene oxide under 95° C. The reduction degree of the graphene oxide is finite. The conductivity of the gained composite becomes worse, thereby affecting the electrochemical property of the material, which is highlighted in the high rate performance. Although the first discharging capacity of 0.2 C reaches to 1396 $mAh \cdot g^{-1}$, its capacity of 1 C is 743 $mAh \cdot g^{-1}$, and its capacity of 2 C is 502 $mAh \cdot g^{-1}$. Therefore, it is urgent to develop the sulfur/carbon composite positive electrode material having the high specific capacity, the long cyclic life and the high rate performance with a friendly environment, a simple efficient process, and easy scaled production, and the preparing method of the same.

SUMMARY OF THE INVENTION

In order to overcome the deficiency of the related art, a purpose of the present invention is to provide a nitrogen-doped graphene coated nano sulfur positive electrode composite material with a high capacity, a high cyclic performance, and a high rate.

Another purpose of the invention is to provide a preparation method of the nitrogen-doped graphene coated nano sulfur positive electrode composite material.

A third purpose of the invention is to provide an application of the nitrogen-doped graphene coated nano sulfur positive electrode composite material tolithium sulfur batteries.

For achieving the above purpose, the invention provides a nitrogen-doped graphene coated nano sulfur positive electrode composite material, and the composite material includes: an effective three-dimensional conductive network formed by overlapping of nitrogen-doped graphenes, and nano sulfur particles coated by nitrogen doped graphene layers evenly.

As a further improvement, a nitrogen content of the nitrogen-doped graphene is 2~10 wt %.

As a further improvement, a conductivity of the nitrogen-doped graphene is 1000~30000 S/m.

As a further improvement, a sulfur content of the composite material is 40~85 wt %.

As a further improvement, a grain size of the nanosulfur-particle is 10~50 nm.

As a further improvement, a discharge capacity of the nitrogen-doped graphene coated nano sulfur positive electrode composite material reaches to 1200 mAh·g$^{-1}$ or more at 0.2 C rate, 1000 mAh·g$^{-1}$ or more at 1 C rate, 800 mAh·g$^{-1}$ or more at 2 C rate, and 600 mAh·g$^{-1}$ or more at 5 C rate, when the nitrogen-doped graphene coated nano-sulfur positive electrode composite material is used as an positive electrode material of a lithium sulfur battery.

As a further improvement, a capacity decay rate of each cycle of the nitrogen-doped graphene coated nanosulfur positive electrode composite material is below 0.028% under 2 C rate and within 2000 cycles, when the nitrogen-doped graphene coated nanosulfur positive electrode composite material is used as an positive electrode material of a lithium sulfur battery.

The invention provides a preparation method of the nitrogen-doped graphene coated nanosulfur positive electrode composite material. The preparation method includes: dispersing nitrogen-doped graphenes in a liquid-phase reaction system including at least sulfur source and acid; and depositing nano sulfur particles by an in-situ chemical reaction of the sulfur source and the acid, thereby preparing the nitrogen-doped graphene coated nano sulfur positive electrode composite material.

As a further improvement, the preparation method further includes preparing the nitrogen-doped graphenes before the dispersing nitrogen-doped graphenes. The preparing the nitrogen-doped graphenes includes: preparing an aqueous dispersion solution of a graphene oxide by a Hummer method, and freezing and drying the aqueous dispersion solution to obtain a graphene oxide powder; and placing the graphene oxide powder in a protective atmosphere, and adding nitrogen-source gas to react with the graphene oxide powder to obtain the nitrogen-doped graphenes.

As a further improvement, the placing the graphene oxide powder includes: placing the graphene oxide powder in a closed reaction environment, and adding protective gas to form the protective atmosphere; adding the nitrogen-source gas in a flow rate of 1-100 ml/min; and increasing a temperature of the closed reaction environment to 600° C.~950° C. within 2 hours, thereby enabling the nitrogen source gasto be completely reacted with the graphene oxide powder to obtain the nitrogen-doped graphenes.

As a further improvement, the nitrogen source gas includes ammonia or a mixture of ammonia and the protective gas, and the protective gas includes argon or nitrogen.

As a further improvement, the sulfur source includes metal salt containing sulfur; the metal salt containing sulfur is one of sodium sulfide, sodium polysulfide, and sodium thiosulfate; and the acid is one of hydrochloric acid, sulphuric acid, formic acid, dicarboxylic acid, phosphoric acid, nitric acid, and acetic acid.

As a further improvement, a reaction temperature of the in-situ chemical reaction is -10° C.~60° C.

An application of the nitrogen-doped graphene coated nano sulfur positive electrode composite material according to any of the above-mentioned preparation of lithium sulfur batteries.

The invention provides a lithium sulfur battery. The lithium sulfur battery includes an positive electrode, a negative electrode, and electrolyte, wherein the positive electrode includes the nitrogen-doped graphene coated nano sulfur positive electrode composite material.

As a further improvement, the positive electrode does not includes other conductive additives except the nitrogen-doped graphene coated nano sulfur positive electrode composite material, whereas the sulfur content of the electrode is above 60 wt %.

Compared with the related art, the benefit of the present invention is listed as follows.

In the nitrogen-doped graphene coated nanosulfur positive electrode composite material, the sulfur fully and efficiently contacts the nitrogen-doped graphene in the electrochemical activity sense, thereby enabling the composite material to have a high conductivity. Meanwhile, the nano sulfur particles may more efficiently and evenly contact the nitrogen-doped graphene. It not only enhances a high utilization rate and a high rate of sulfur, but also increases the energy density of the battery without extra conductive additives (such as 20 wt %). The nitrogen-doped graphene with a sheet-shaped folding structure has a coating function, and there is an interaction between unshared pair electrons of the nitrogen element and the polysulfide produced in the charging and discharging process. The coating function and the interaction restrain the dissolution of sulfur ions happened in the lithium sulfur batteries and the shuttle effect, and also enhance the cyclic performance of the batteries, thereby improving the entire performance of the lithium sulfur batteries. The lithium sulfur batteries, with the nitrogen-doped graphene coated nano sulfur positive electrode composite material as the positive electrode material, has a high capacity, a high cyclic performance, and a high rate. The preparation method of the composite material is easy, and the cost is low, thereby to be suitable for large-scale production.

DETAILED DESCRIPTION OF THE PREFERRED EMBODIMENT

The following content combines with the figures and the embodiments for describing the present invention in detail. It is obvious that the following embodiments are only some embodiments of the present invention. For an ordinary person skilled in the art without any creative effort, other embodiments obtained thereby are still covered by the present invention.

One aspect of the present disclosure provides a nitrogen-doped graphene coated nano sulfur composite positive electrode material, which is mainly composed of a nitrogen-doped graphene and nano sulfur particles. Wherein the nano sulfur particles are coated by the nitrogen-doped graphene evenly, and the nitrogen-doped graphene with a high conductivity is formed as an effective three-dimensional conductive network through overlapping.

Figure 1:
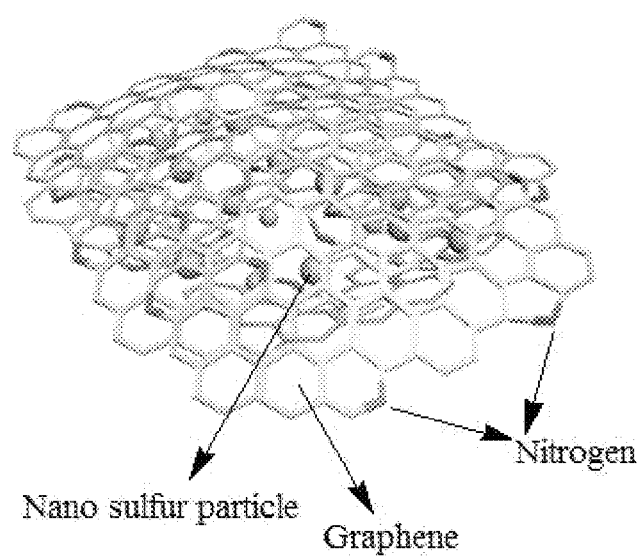
FIG. 1 is a schematic view of an embodiment of a nitrogen-doped graphene coated nanosulfur positive electrode composite material.

A typical structure of the nitrogen-doped graphene coated nano sulfur composite positive electrode material is shown in FIG. 1.

As a further improvement, a nitrogen content of the nitrogen-doped graphene is 2~10 wt %, a conductivity thereof is 1000~30000 S/m, and the nitrogen content and the conductivity can be controlled by the temperature and time of the reduction and nitriding.

As a further improvement, a size of the nano sulfur particle is 10~50 nm.

As a further improvement, a sulfur content of the nitrogen-doped graphene coated nano sulfur particles composite material is 40~85 wt %.

As a further improvement, when the composite material is used as an positive electrode material of the lithium sulfur battery, a discharge capacity of the composite material can reach to more than 1200 mAh·g$^{-1}$ at 0.2 C rate, more than 1000 mAh·g$^{-1}$ at 1 C rate, more than 800 mAh·g$^{-1}$ at 2 C rate, and more than 600 mAh·g$^{-1}$ at 5 C rate. A low capacity decay rate of the composite material is obtained within 2000 cycles at 2 C rate (the capacity decay rate of each cycle is below 0.028%), such that a high cyclic stability is maintained.

Another aspect of the present disclosure provides a preparation method of a nitrogen-doped graphene coated nano sulfur composite positive electrode material, which includes: dispersing the nitrogen-doped graphene in a liquid-phase reaction system containing at least sulfur source and acid; depositing the nano sulfur particles by the in-situ chemical reaction of the sulfur source and the acid, thereby preparing the nitrogen-doped graphene coated nano sulfur composite positive electrode material.

The nitrogen-doped graphene may be prepared by the various schemes well-known in the art. For example, the graphene oxide powder may be placed in a protective atmosphere, and the nitrogen-source gas is added to react with the graphene oxide powder to obtain the nitrogen-doped graphene.

The graphene oxide powder may be also prepared by the various schemes well-known in the art. The aqueous dispersion of the graphene oxide may be prepared by the Hummer method, and the powder of graphene oxide is obtained by freezing and drying.

In a more specific embodiment, the graphene oxide powder may be placed in a closed reaction environment, a protective atmosphere is formed by adding the protective gas (such as an inert gas, etc.). The nitrogen-source gas is added in the flow rate of 1-100 ml/min, and the temperature in the closed reaction environment is increased to 600° C.~950° C. in 2 hours, so that the nitrogen-source gas may be completely reacted with the graphene oxide powder, thereby obtaining the nitrogen-doped graphene.

The nitrogen-source gas may be, but not limited, selected from the ammonia or the mixture of ammonia and the protective gas (such as argon, nitrogen, etc.). 100% ammonia is preferred.

The flow rate of the nitrogen-source gas is particularly preferred to be 30 ml/min.

The temperature range of the nitriding reaction is particularly preferred to be 750° C. In the nitriding process of the graphene oxide, the temperature in the reaction environment is raised to 600° C.~950 ° C. in a preferred time that is less than or equal to 25 minutes, and it preferably keeps warm for 0.1~24 h (30 minutes is preferred) after reaching to the reaction temperature As a further improvement, the nitrogen content and the electrical conductivity of the related nitrogen-doped graphene may be adjusted by controlling the reaction temperature and time, during the nitriding process of the graphene oxide.

As a further improvement, in the process of the in-situ chemical reaction of the sulfur source and the acid, the size of the related nano sulfur particles may be adjusted by controlling the reaction temperature and the concentration of the sulfur source.

As a further improvement, the sulfur content of the nitrogen-doped graphene coated nano sulfur particle composite material may be controlled by the mass of the added sulfur source.

In a typical embodiment, the preparing method of the nitrogen-doped graphene coated nano sulfur positive electrode composite material includes: preparing the aqueous dispersion solution of the graphene oxide by the Hummer method; obtaining the graphene oxide powder by freezing and drying; placing a certain weight of the graphene oxide powder in a corundum crucible; transferring the graphene oxide powder into a tube furnace; replacing the gas in the tube furnace with the inert gas, and then replacing the inert gas with nitrogen-source gas; heating up the tube furnace to a predetermined temperature and keeping the predetermined temperature for a certain time, and then naturally cooling to a room temperature to obtain the nitrogen-doped graphene; dispersing the obtained nitrogen-doped graphene into the ultra pure water by ultrasonic wave; and preparing the nitrogen-doped graphene coated nano sulfur composite material by depositing sulfurin the in-situ chemical reaction.

In the present disclosure, the sulfur source preferably adopts a metal salt containing sulfur, for example, one of sodium sulfide, sodium polysulfide ($Na_2S_x$, x=2~8), and sodium thiosulfate, and the like, or the mixture thereof, but not limited thereto.

In the present disclosure, the acid is one of hydrochloric acid, sulphuric acid, formic acid, dicarboxylic acid, phosphoric acid, nitric acid, and acetic acid, or the mixture thereof, but not limited thereto.

The reaction temperature of the in-situ chemical reaction reaches to −10° C.~60 C. preferably, particularly at 0° C.

The present disclosure also provides an application of the nitrogen-doped graphene coated nano sulfur positive electrode composite material to the preparation of lithium sulfur batteries, such as an application as the positive electrode material of the lithium sulfur battery devices.

Furthermore, the present disclosure provides a lithium sulfur battery, which includes an positive electrode, a negative electrode, and electrolytes. The positive electrode contains any one of the nitrogen-doped graphene coated nano sulfur positive electrode composite materials as described above.

As a further improvement, the positive electrode may include a current collector and a coating layer. Wherein the coating layer may be mainly composed of the nitrogen-doped graphene coated nano sulfur positive electrode composite material and multiple binders known in the art, and may also contain common auxiliary ingredients known in the art.

In the present disclosure, the graphene oxide, which is already prepared by the Hummer method on a large scale, is used as the raw material, and the nitrogen-doped graphene with a high conductivity is obtained by the doping the nitrogen and reducing the raw material at a high temperature under the condition of the presence of nitrogen-containing gas including the ammonia gas. Furthermore, the nitrogen-doped graphene is used as the conductive substrate, and the nitrogen-doped graphene coated nano sulfur positive electrode composite materials are prepared by the chemical reaction of in-situ loaded coating, so as to achieve the purpose of even distribution. On the basis of no conductive agent added, the utilization rate of sulfur may be increased as far as possible, and the dissolution of sulfur ions happened during the electrochemical reaction and the shuttling between two poles may be restrained. Also, the electrochemical stability and the cyclic performance of the positive electrode materials may be improved, for example, maintaining the discharge capacity of 700 mAh/g or above after 100 cyclic times of charging and discharging at 2 C high rate, which is suitable for preparing the lithium sulfur battery with a high capacity, a high cyclic performance and a high rate.

The following content is combined with the figures and the embodiments for describing the present disclosure in detail, but the protection scope of the present disclosure is not limited to these embodiments.

In a first embodiment, the nitrogen-doped graphene coated nano sulfur positive electrode composite material 1 is prepared.

Step one, the preparation method of graphene oxide by the Hummers method includes the followings: putting the natural graphite powder (20 g) into the concentrated sulfuric acidic solution (30 mL) which contains the potassium persulfate (10 g) and the $P_2O_5$ (10 g); cooling the concentrated sulfuric acidic solution to a room temperature naturally after a reaction under 80° C. for 6 hours; filtering, washing, and drying the concentrated sulfuric acidic solution to get the pre-oxidated graphite; putting the pre-oxidated graphite into the concentrated sulfuric acid (12 mL); adding the potassium permanganate (1.5 g) to the concentrated sulfuric acid in batches under vigorous stirring in the ice bath condition; heating up the concentrated sulfuric acid to 35° C. and keeping reacting for 2 hours; slowly adding deionized water (24 mL) to the reaction system for dilution; heating up the obtained mixtures to 80° C. and keep reacting for half an hour, and then returning to a room temperature; adding deionized water (70 ml) to the obtained mixtures; stopping the reaction by 30% of the hydrogen peroxide (1.25 ml); filtering the obtained yellow suspension; removing metal ions from the obtained yellow suspension with 5 wt % dilute hydrochloric acid (125 ml); washing the yellow suspension three times in deionized water to obtain the viscous solid; dispersing the obtained viscous solid into deionized water, removing the precipitation through centrifugation, and dialyzing the remainders for more than 2 weeks to get the dispersion solution of graphene oxide; and obtaining graphene oxide powder (0.6 g) after cryodesiccation.

Step two, the preparation method of the nitrogen-doped graphenel includes followings: putting the graphene oxide powder (0.6 g) into the corundum boat; transferring the corundum boat into the quartztube of the tube furnace, replacing the air in the system with the argon (purity 99.99%), and then adding the pure ammonia gas into the system with the flaw rate at 30 ml/min; setting the rate of the heating as 30° C./min; and obtaining the nitrogen-doped graphene (0.4 g) when the temperature is up to 750° C. and lasts for 30 minutes. The conductivity of the nitrogen-doped graphene 1 is 27200 S/m and the nitrogen content of the nitrogen-doped graphene 1 is 3.4 wt % tested by the four electrode method.

Figure 2:
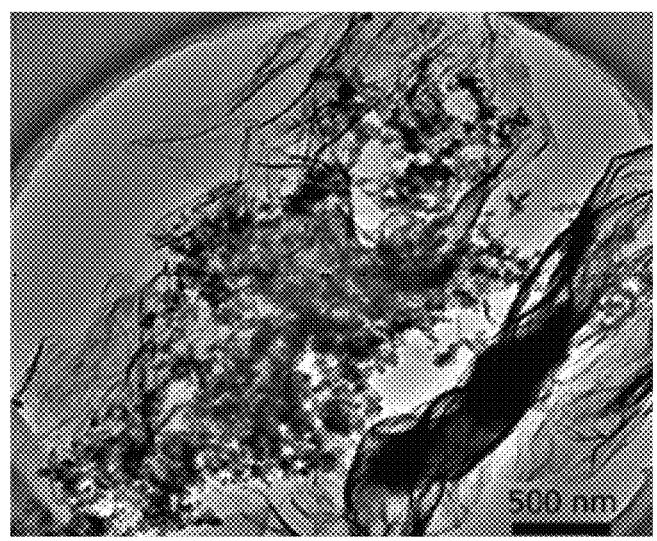
FIG. 2 is a stereoscan photograph of a first embodiment of a nitrogen-doped graphene coated nanosulfur positive electrode composite material 1.
Figure 3:
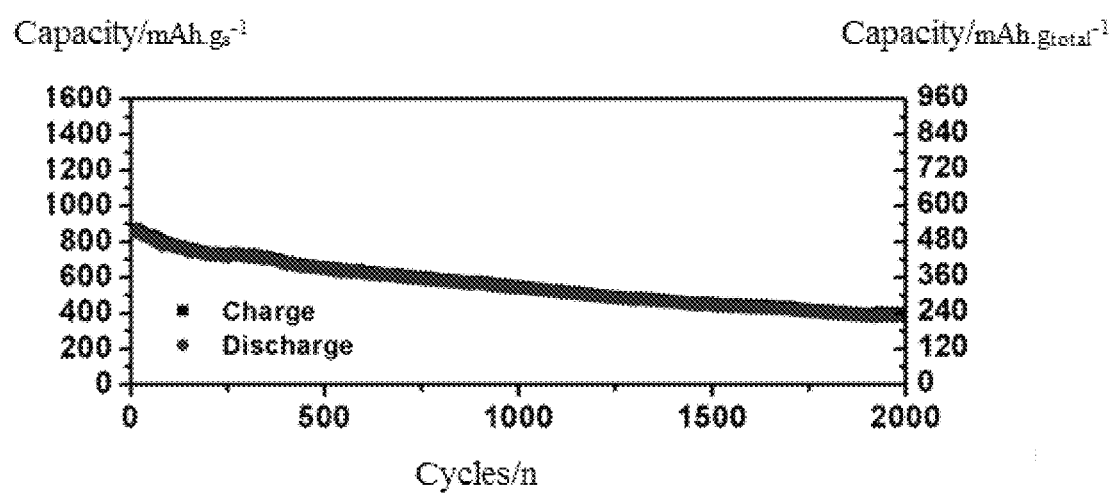
FIG. 3 is a chart of an electrochemical performance test of the first embodiment of the nitrogen-doped graphene coated nano sulfur positive electrode composite material 1.
Figure 4:
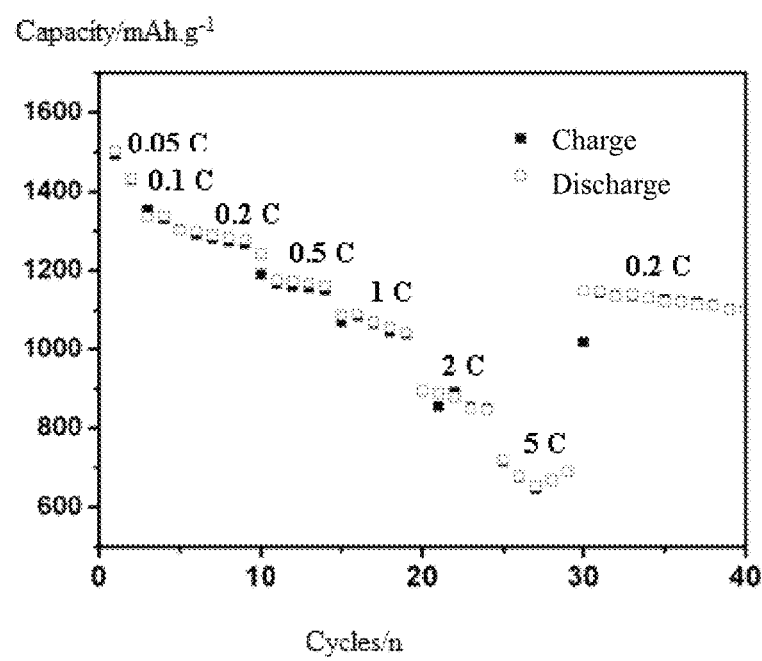
FIG. 4 is a chart of a charge and discharge capacity of the first embodiment of the nitrogen-doped graphene coated nano sulfur positive electrode composite material 1 with different rates.
Figure 5:
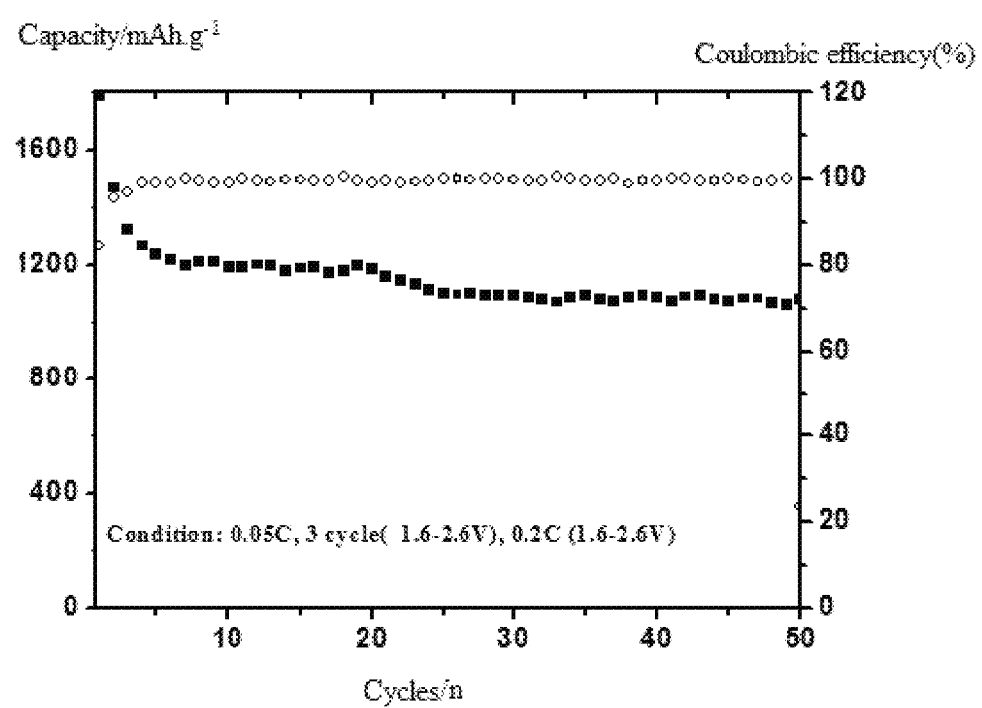
FIG. 5 is a chart of an electrochemical performance test of the second embodiment of the nitrogen-doped graphene coated nano sulfur positive electrode composite material 2.
Figure 6:
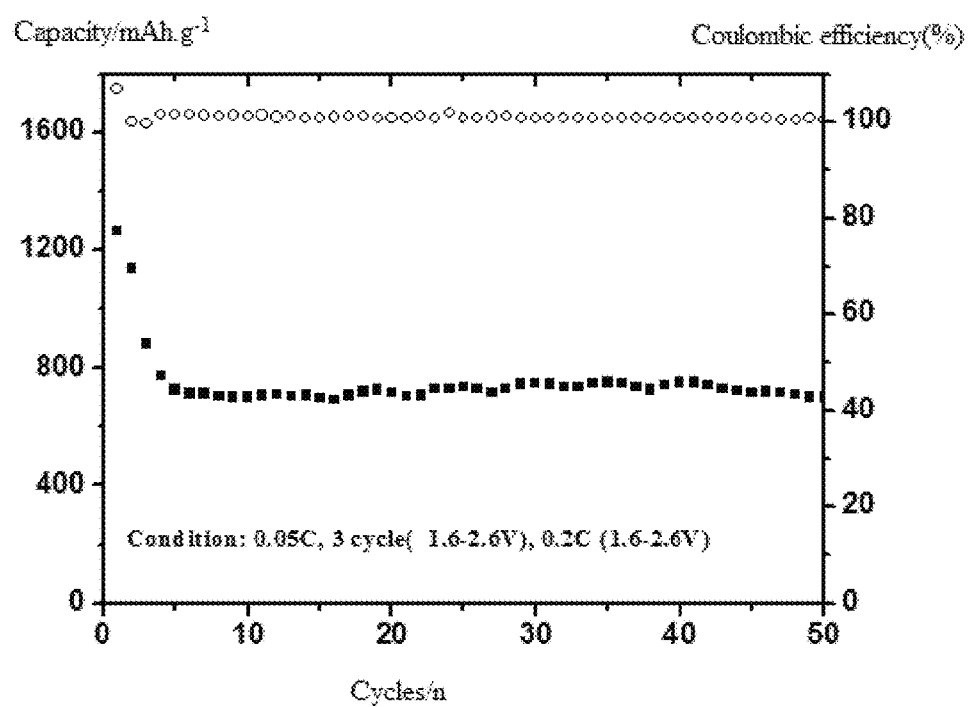
FIG. 6 is a chart of an electrochemical performance test of the third embodiment of the nitrogen-doped graphene coated nano sulfur positive electrode composite material 3.

Step three, the preparation method of the nitrogen-doped graphene coated nano sulfur positive electrode composite material 1 includes followings: based on the reaction equation $(2Na_2S+Na_2S_2O_3+6HCOOH=4S+6HCOONa+3H_2O)$, dissolving 2.7 g sodium sulfide nonahydrate ($Na_2S.9H_2O$) and 0.89 g sodium thiosulfate in 50 ml of deionized water, adding the deionized water under vigorous stirring to the aqueous dispersion including 150 mg nitrogen-doped graphene 1; stirring the obtained mixed solution continuously for 2 hours; dropping 50 ml of formic acid solution (2M) slowly at the speed of 30 to 40 drops per minute below zero degree; and reacting overnight, filtering the above mixture and washing the mixture with deionized water and drying the mixture to obtain 0.5 g of the nitrogen-doped graphene coated nano sulfur composite positive electrode material 1, as shown in FIG. 2. The size of the nanosulfur particle is less than 50 nm. The sulfur content of the nitrogen-doped graphene coated nano sulfur composite positive electrode material 1 is 65.2 wt % in the results of thermogravimetric analysis.

In a second embodiment, the nitrogen-doped graphene coated nano sulfur positive electrode composite material 2 is prepared.

Step one, the preparation method of graphene oxide by the Hummers method is the same as the step one of the first embodiment.

Step two, the nitrogen-doped graphene 2 is prepared. The preparation method of nitrogen-doped graphene 2 includes followings: putting 0.6 g graphene oxide powder into the corundum boat; transferring the corundum boat into the quartz tube of the tube furnace; replacing the air in the system with argon (purity 99.99%), adding pure ammonia gas into the system, and maintaining the flaw rate of pure ammonia gas at 100 mL/min and the flaw rate of argon (purity 99.99%) at 1000 mL/min; and obtaining 0.3 g nitrogen-doped graphene by rising the temperature up to 750 degree (unless specifically stated, all is ° C) and lasting for 120 minutes for nitridation. The conductivity of the nitrogen-doped graphene 2 is 20000 S/m and the nitrogen content is 3.1 wt % tested by the four electrode method.

Step three, the nitrogen-doped graphene coated nano sulfur positive electrode composite material 2 is prepared. The preparation method of the nitrogen-doped graphene coated nano sulfur positive electrode composite material 2 includes followings: dissolving 0.89 g sodium thiosulfate in 50 ml of deionized water; adding the deionized water under vigorous stirring into the aqueous dispersion solution including 150 mg nitrogen-doped graphene 2; stirring the obtained mixed solution continuously for 2 hours; dropping 50 ml hydrochloric acid solution (2M) slowly at the speed of 30 to 40 drops per minute under a room temperature; reacting overnight; and filtering the mixture, washing the mixture with deionized water, and drying the mixture, to obtain 0.3 g nitrogen-doped graphene coated nano sulfur composite positive electrode material 2, which has a similar morphology to that in the first embodiment. The size of nanosulfur particle is about 20-50 nm. The sulfur content of the nitrogen-doped graphene coated nano sulfur composite positive electrode material 2 is 45 wt % in the results of thermogravimetric analysis.

In the third embodiment, the nitrogen-doped graphene coated nano sulfur positive electrode composite material 3 is prepared.

Step one, the graphene oxide is prepared by the Hummers method, wherein the preparation method of the graphene oxide is the same as the step one of the first embodiment.

Step two, the nitrogen-doped graphene 3 is prepared, wherein the preparation method of the nitrogen-doped graphene 3 includes followings: putting 0.6 g graphene oxide powder into the corundum boat; transferring the corundum boat into the quartz tube of the tube furnace, replacing the air in the system with argon (purity 99.99%), and then adding the pure ammonia gas into the system and maintaining the flaw rate of pure argon at 30 mL/min; setting the rate of the heating as 30° C./min; and obtaining the nitrogen-doped graphene (0.2 g) when the temperature is up to 900° C.; and lasts for 30 minutes. The conductivity of the nitrogen-doped graphene 3 is 26500 S/m and the nitrogen content is 4.2 wt % tested in the four electrode method.

Step three, the nitrogen-doped graphene coated nano sulfur positive electrode composite material 3 is prepared, wherein the preparation method of nitrogen-doped graphene coated nano sulfur positive electrode composite material 3 includes followings: based on the reaction equation ($2Na_2S+Na_2S_2O_3+6HCOOH=4S+6HCOONa+3H_2O$), dissolving 10.g sodium sulfide nonahydrate ($Na_2S.9H_2O$) and 3.56 g sodium thiosulfate in 50 ml of deionized water, adding the deionized water under vigorous stirring to the aqueous dispersion solution including 150 mg nitrogen-doped graphene 3; stirring the obtained mixed solution continuously for 2 hours; dropping 50 ml formic acid solution (2M) slowly at the speed of 30 to 40 drops per minute under the temperature of 4 degree below zero; reacting overnight; and filtering the mixture, washing the mixture with deionized water, and drying the mixture, to obtain 0.7 g nitrogen-doped graphene coated nano sulfur composite positive electrode material 3, which has a similar morphology to the that in the first embodiment. The size of the nanosulfur particle is less than 50 nm. The sulfur content of the nitrogen-doped graphene coated nano sulfur positive electrode composite material 3 is shown as 80% in the results of thermogravimetric analysis.

In a fourth embodiment, the electrochemical performance of the nitrogen-doped graphene coated nano sulfur positive electrode composite material 1 is measured. The nitrogen-doped graphene coated nano sulfur positive electrode composite material 1 is used as the positive electrode material of the lithium sulfur battery. The nitrogen-doped graphene coated nano sulfur positive electrode composite material 1 is mixed with the binder PVDF with a mass ratio of 92:8. The N-methylpyrrolidone is used as the solvent. The above mixture is evenly coated on the aluminum foil. The average sulfur load of the electrode is 0.8 mg/cm$^2$. The aluminum foil is vacuum dried for 24 hours at 50° C., and punched. In a glove box with argon, the lithium foil is used as the negative electrode, 1,3-dioxolane/ethylene glycol dimethyl ether (volume ratio 1:1) with the lithium bistrifluoromethanesulfonimide (1M), including 1 wt % of lithium nitrate, and $Li_2S_8$ (0.025M) are the electrolyte, and the battery is assembled with a 2025 battery shell. The electrochemical performance of the battery is tested through a Lanhe equipment. The sulfur content of the positive electrode is 60 wt %, and the capacity is still above 400 mAh/g after 2000 cycles of the charging and discharging with 2 C rate.

In a fifth embodiment, the electrochemical performance of nitrogen-doped graphene coated nano sulfur positive electrode composite material 2 includes followings is measured.

The nitrogen-doped graphene coated nano sulfur positive electrode composite material 2 is used as the positive electrode material of the lithium sulfur battery. The nitrogen-doped graphene coated nano sulfur positive electrode composite material 2 is mixed with the binder PVDF with mass ratio of 92:8. The N-methylpyrrolidone is used as the solvent. The above mixture is evenly coated on the aluminum foil. The average sulfur load of the electrode is 0.8 mg/cm$^2$. The aluminum foil is vacuum dried for 24 hours at 50° C., and punched. In a glove box with argon, the lithium foil is used as the negative electrode, 1,3-dioxolane/ethylene glycol dimethyl ether (volume ratio 1:1) with the lithium bistrifluoromethanesulfonimide (1M), including 1 wt % of lithium nitrate, and $Li_2S_8$ (0.025M) are the electrolyte, and the battery is assembled with a 2025 battery shell. The electrochemical performance of the battery is tested through a Lanhe equipment. The sulfur content of the positive electrode is about 40 wt %, and the capacity is still above 1000 mAh/g after 50 cycles of the charging and discharging with 0.2 C rate.

In a sixth embodiment, the electrochemical performance of nitrogen-doped graphene coated nano sulfur positive electrode composite material 3 includes followings is measured.

The nitrogen-doped graphene coated nano sulfur positive electrode composites 3 is used as the positive electrode material of the lithium sulfur battery. The nitrogen-doped graphene coated nano sulfur positive electrode composite material 3 is mixed with the binder PVDF with mass ratio of 92:8. The N-methylpyrrolidone is used as the solvent. The above mixture is evenly coated on the aluminum foil. The average sulfur load of the electrode is 0.8 mg/cm$^2$. The aluminum foil is vacuum dried for 24 hours at 50° C., and punched. In a glove box with argon, the lithium foil is used as the negative electrode, 1,3-dioxolane/ethylene glycol dimethyl ether (volume ratio 1:1) with the lithium bistrifluoromethanesulfonimide (1M), including 1 wt % of lithium nitrate, and $Li_2S_8$ (0.025M) are the electrolyte, and the battery is assembled with a 2025 battery shell. The electrochemical performance of the battery is tested through a Lanhe equipment. The sulfur content of the positive electrode is 70 wt %, and the capacity is still above 700 mAh/g after 50 cycles of the charging and discharging with 0.2 C rate.

Besides, it can be understood that, although the present disclosure is describe according to the embodiments, each embodiment does not include only on dependent technology solution. The description of the present disclosure is only for clarity. The person skilled in the art should regard the present disclosure as an entirety. Technology solutions in the embodiments can be adequately combined to form other embodiments that can be understood by the person skilled in the art.

What is claimed is:

1. A method of forming a nitrogen-doped graphene coated nano-sulfur positive electrode composite material, comprising:
   overlapping nitrogen-doped graphene layers to from an effective three-dimensional conductive network; and
   forming the nitrogen-doped graphene coating nano-sulfur positive electrode composite material by evenly coating nano sulfur particles with the overlapped nitrogen-doped graphene layers such that the nano sulfur particles are in between the overlapped nitrogen-doped graphene layers.

2. The method of forming the nitrogen-doped graphene coated nano sulfur positive electrode composite material according to claim 1, wherein a nitrogen content of the nitrogen-doped graphene is 2~10 wt %.

3. The method of forming the nitrogen-doped graphene coated nano sulfur positive electrode composite material according to claim 1, wherein a conductivity of the nitrogen-doped graphene is 1000~30000 S/m.

4. The method of forming the nitrogen-doped graphene coated nano sulfur positive electrode composite material according to claim 1, wherein a sulfur content of the composite material is 40~85 wt %.

5. The method of forming the nitrogen-doped graphene coated nano sulfur positive electrode composite material according to claim 1, wherein a grain size of the nano sulfur particle is 10~50 nm.

6. The method of forming the nitrogen-doped graphene coated nano sulfur positive electrode composite material according to claim 1, wherein a discharge capacity of the nitrogen-doped graphene coated nano sulfur positive electrode composite material reaches to 1200 mAh.g$^{-1}$ or more at 0.2C rate, 1000 mAh.g$^{-1}$ or more at 1C rate, 800 mAh.g$^{-1}$ or more at 2C rate, and 600 mAh.g$^{-1}$ or more at 5C rate, when the nitrogen-doped graphene coated nano sulfur positive electrode composite material is used as an positive electrode material of a lithium sulfur battery.

7. The method of forming the nitrogen-doped graphene coated nano sulfur positive electrode composite material according to claim 1, wherein a capacity decay rate of each cycle of the nitrogen-doped graphene coated nano sulfur positive electrode composite material is below 0.028% under 2C rate and within 2000 cycles, when the nitrogen-doped graphene coated nano sulfur positive electrode composite material is used as an positive electrode material of a lithium sulfur battery.

8. The method of forming the nitrogen-doped graphene coated nano sulfur positive electrode composite material according to claim 1, wherein:
   the overlapping nitrogen-doped graphene layers is dispersing nitrogen-doped graphenes in a liquid-phase reaction system comprising at least sulfur source and acid; and
   wherein the forming the nitrogen-doped graphene coated nano-sulfur positive electrode composite material is depositing nano sulfur particles by an in-situ chemical reaction of the sulfur source and the acid, thereby preparing the nitrogen-doped graphene coated nano sulfur positive electrode composite material.

9. The method of forming the nitrogen-doped graphene coated nano sulfur positive electrode composite material according to claim 8, further comprising preparing the nitrogen-doped graphenes before the dispersing nitrogen-doped graphenes, wherein the preparing the nitrogen-doped graphenes comprises:
   preparing an aqueous dispersion solution of a graphene oxide by a Hummer method, and freezing and drying the aqueous dispersion solution to obtain a graphene oxide powder; and
   placing the graphene oxide powder in a protective atmosphere, and adding nitrogen-source gas to react with the graphene oxide powder to obtain the nitrogen-doped graphenes.

10. The method of forming the nitrogen-doped graphene coated nano sulfur positive electrode composite material according to claim 9, wherein the placing the graphene oxide powder comprises:
    placing the graphene oxide powder in a closed reaction environment, and adding protective gas to form the protective atmosphere;
    adding the nitrogen-source gas in a flow rate of 1~100 ml/min; and
    increasing a temperature of the closed reaction environment to 600° C.~950° C. within 2 hours, thereby enabling the nitrogen-source gas to be completely reacted with the graphene oxide powder to obtain the nitrogen-doped graphenes.

11. The method of forming the nitrogen-doped graphene coated nano sulfur positive electrode composite material according to claim 9, wherein the nitrogen-source gas comprises ammonia or a mixture of ammonia and the protective gas, and the protective gas comprises argon or nitrogen.

12. The method of forming the nitrogen-doped graphene coated nano sulfur positive electrode composite material according to claim 8, wherein the sulfur source comprises metal salt containing sulfur; the metal salt containing sulfur is one of sodium sulfide, sodium polysulfide, and sodium thiosulfate; and the acid is one of hydrochloric acid, sulfuric acid, formic acid, dicarboxylic acid, phosphoric acid, nitric acid, and acetic acid.

13. The method of forming the nitrogen-doped graphene coated nano sulfur positive electrode composite material according to claim 8, wherein a reaction temperature of the in-situ chemical reaction is −10° C.~60° C.

14. A lithium sulfur battery, comprising a positive electrode, a negative electrode, and electrolyte, wherein the positive electrode comprises the nitrogen-doped graphene coated nano sulfur positive electrode composite material according to claim 1.

15. The lithium sulfur battery according to claim 14, wherein the positive electrode does not comprise other conductive additives except the nitrogen-doped graphene coated nano sulfur positive electrode composite material.

16. The method of forming the nitrogen-doped graphene coated nano sulfur positive electrode composite material according to claim 12, wherein a reaction temperature of the in-situ chemical reaction is −10° C.~60° C.

* * * * *